United States Patent
Kwon et al.

(10) Patent No.: US 12,347,341 B2
(45) Date of Patent: Jul. 1, 2025

(54) VR-BASED FIRE RESPONSE SIMULATION METHOD AND DEVICE FOR SECONDARY BATTERY PRODUCTION

(71) Applicant: LG ENERGY SOLUTION, LTD., Seoul (KR)

(72) Inventors: Min Hee Kwon, Daejeon (KR); Saewhan Park, Daejeon (KR); Jun Seop Park, Daejeon (KR); Youngduk Kim, Daejeon (KR); Nam Hyuck Kim, Daejeon (KR); Su Ho Jeon, Daejeon (KR); Youngsang Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/276,017

(22) PCT Filed: Jul. 20, 2022

(86) PCT No.: PCT/KR2022/010576
§ 371 (c)(1),
(2) Date: Aug. 4, 2023

(87) PCT Pub. No.: WO2023/106539
PCT Pub. Date: Jun. 15, 2023

(65) Prior Publication Data
US 2024/0105075 A1   Mar. 28, 2024

(30) Foreign Application Priority Data
Dec. 6, 2021   (KR) .................. 10-2021-0172983

(51) Int. Cl.
G09B 9/00   (2006.01)
A62C 99/00   (2010.01)
(Continued)

(52) U.S. Cl.
CPC ............ *G09B 9/00* (2013.01); *A62C 99/0081* (2013.01); *G06F 3/013* (2013.01); *G09B 7/00* (2013.01)

(58) Field of Classification Search
CPC ........ G09B 9/00; G09B 7/00; A62C 99/0081; G06F 3/013
See application file for complete search history.

(56) References Cited

U.S. PATENT DOCUMENTS

| | | | |
|---|---|---|---|
| 6,663,393 B1 * | 12/2003 | Ghaly .................... | A63H 29/22 434/262 |
| 8,928,585 B2 * | 1/2015 | Mondragon .......... | G06V 40/20 345/156 |

(Continued)

FOREIGN PATENT DOCUMENTS

| | | |
|---|---|---|
| JP | 2019-12154 A | 1/2019 |
| JP | 202173867 A | 11/2021 |

(Continued)

*Primary Examiner* — Xuan M Thai
*Assistant Examiner* — Sadaruz Zaman
(74) *Attorney, Agent, or Firm* — Bryan Cave Leighton Paisner LLP

(57) ABSTRACT

Systems and methods for executing instructions for executing a virtual reality (VR)-based fire response simulation method for secondary battery production are disclosed. One method includes receiving a gaze direction and gaze location of a user identified from a head mounted display (HMD). Fire response content associated with a secondary battery production apparatus corresponding to the received gaze direction and gaze location is displayed on an area of a display of the HMD. The fire response content includes a plurality of fire response scenarios. User behavior information indicating a motion of the user determined from at least one of the HMD or a controller associated with the HMD is obtained. The fire response content associated with the (Continued)

secondary battery production apparatus is executed based on the obtained user behavior information.

15 Claims, 11 Drawing Sheets

(51) Int. Cl.
    *G06F 3/01*     (2006.01)
    *G09B 7/00*     (2006.01)

(56) References Cited

U.S. PATENT DOCUMENTS

| | | | | |
|---|---|---|---|---|
| 8,938,395 | B2* | 1/2015 | Willner | G06Q 30/0248 |
| | | | | 705/14.47 |
| 9,285,589 | B2* | 3/2016 | Osterhout | G02B 27/017 |
| 9,341,843 | B2* | 5/2016 | Border | G06F 3/013 |
| 9,366,862 | B2* | 6/2016 | Haddick | G06F 3/011 |
| 9,759,917 | B2* | 9/2017 | Osterhout | G06F 3/011 |
| 9,925,458 | B2* | 3/2018 | Fateh | A63F 13/28 |
| 10,180,572 | B2* | 1/2019 | Osterhout | G06Q 30/02 |
| 10,539,787 | B2* | 1/2020 | Haddick | G06F 3/0428 |
| 10,860,100 | B2* | 12/2020 | Osterhout | G06F 3/0346 |
| 11,275,482 | B2* | 3/2022 | Osterhout | G06F 3/017 |
| 11,562,528 | B2* | 1/2023 | Rockel | G06F 3/012 |
| 11,778,140 | B2* | 10/2023 | Linden | G06F 3/011 |
| | | | | 348/14.08 |
| 11,830,602 | B2* | 11/2023 | Shelton, IV | G16H 40/60 |
| 11,883,022 | B2* | 1/2024 | Shelton, IV | A61B 18/14 |
| 2008/0300055 | A1* | 12/2008 | Lutnick | G07F 17/32 |
| | | | | 463/39 |
| 2015/0310758 | A1* | 10/2015 | Daddona | G09B 9/02 |
| | | | | 434/30 |
| 2016/0133151 | A1* | 5/2016 | O'Dowd | G08B 7/02 |
| | | | | 434/236 |
| 2016/0166880 | A1* | 6/2016 | Nakajima | G06Q 10/0639 |
| | | | | 434/247 |
| 2016/0187654 | A1* | 6/2016 | Border | G02B 27/0172 |
| | | | | 359/630 |
| 2018/0224947 | A1* | 8/2018 | Ng | G06F 3/167 |
| 2018/0280556 | A1* | 10/2018 | Fateh | B05B 7/1613 |
| 2022/0069277 | A1* | 3/2022 | Lee | H01M 10/446 |
| 2023/0400920 | A1* | 12/2023 | Itkowitz | G16H 80/00 |
| 2024/0105075 | A1* | 3/2024 | Kwon | G09B 9/00 |
| 2024/0412663 | A1* | 12/2024 | Kim | G02B 27/0101 |

FOREIGN PATENT DOCUMENTS

| | | |
|---|---|---|
| KR | 10-1892238 B1 | 9/2018 |
| KR | 10-2020-0058024 A | 5/2020 |
| KR | 10-202-0087000 A | 7/2020 |
| KR | 10-2137040 B1 | 7/2020 |
| KR | 10-2158414 B1 | 9/2020 |
| KR | 10-2167203 B1 | 10/2020 |
| KR | 10-2204198 B1 | 1/2021 |
| KR | 10-2021-0088337 A | 7/2021 |
| KR | 10-2300082 B1 | 9/2021 |

* cited by examiner

VR-BASED FIRE RESPONSE SIMULATION METHOD AND DEVICE FOR SECONDARY BATTERY PRODUCTION

CROSS-REFERENCE TO RELATED APPLICATION

This application is a National Phase entry pursuant to 35 U.S.C. 371 of International Application No. PCT/KR2022/010576 filed on Jul. 20, 2022, which claims priority to and the benefit of Korean Patent Application No. 2021-0172983 filed on Dec. 6, 2021, the disclosure of which is incorporated herein by reference in its entirety.

TECHNICAL FIELD

The following description relates to a virtual reality (VR)-based fire response simulation method and device for secondary battery production, and to a VR-based fire response simulation method and device for training secondary battery production workers.

BACKGROUND

Due to recent growth of the electric vehicle market, demand for development and production of secondary batteries is rapidly increasing. In response to such an increase in demand for secondary batteries, the number of production plants for secondary battery production is also increasing. However, the number of skilled workers for operating such a secondary battery production plant is remarkably insufficient.

On the other hand, in the past, training and education of new workers was conducted by watching and learning skilled workers, but it was difficult to train and educate new workers for a long time due to a busy secondary battery production schedule. In addition, there is an issue in that it is difficult to sufficiently secure skilled workers due to frequent retirement of workers. In addition, even if the worker is trained on a general method of operating a factory, it is not easy for the worker to immediately respond to emergency situations such as fire or various types of failures that may occur during the operation of the factory.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

An aspect provides a VR-based fire response simulation method for secondary battery production, a computer program stored in a non-transitory computer readable medium, a non-transitory computer readable medium in which a computer program is stored, and a device (system) for solving the above issues.

The present disclosure may be implemented in a variety of ways, including a method, a device (system), a computer program stored in a non-transitory computer-readable medium, or a non-transitory computer-readable medium in which a computer program is stored.

According to an aspect, there is provided a virtual reality (VR)-based fire response simulation device for secondary battery production, including a memory configured to store at least one instruction, and at least one processor configured to execute the at least one instruction stored in the memory to perform operations. The operations may include receiving a gaze direction and gaze location of a user identified from a head mounted display (HMD), displaying fire response content associated with a secondary battery production apparatus corresponding to the received gaze direction and gaze location on an area of a display of the HMD, the fire response content including a plurality of fire response scenarios, obtaining user behavior information indicating a motion of the user determined from at least one of the HMD or a controller associated with the HMD, and executing the fire response content associated with the secondary battery production apparatus based on the obtained user behavior information.

According to an example embodiment, the operations may further include, upon determining, based on the gaze direction and gaze location of the user, a gaze of the user at a predetermined location for a predetermined amount of time, determining that at least one of the plurality of fire response scenarios is resolved.

According to an example embodiment, the operations may further include, upon determining, based on the user behavior information, an action associated with fire propagation is performed by the user, determining that at least one of the plurality of fire response scenarios is resolved.

According to an example embodiment, the operations may further include, upon determining, based on the user behavior information, a touch of the user at a predetermined area, determining that at least one of the plurality of fire response scenarios is resolved.

According to an example embodiment, the operations may further include, upon determining at least one of the plurality of fire response scenarios is completed, displaying question information associated with the at least one of the plurality of fire response scenarios, and receiving a response to the question information.

According to an example embodiment, the operations may further include determining whether the user satisfies a guide condition based on the gaze direction and gaze location of the user, and upon determining the user satisfies the guide condition, displaying user guide information associated with at least one of the plurality of fire response scenarios.

According to an example embodiment, the operations may further include determining whether at least one of the plurality of fire response scenarios is completed by the user, upon determining the at least one of the plurality of fire response scenarios is completed, calculating response capability information of the user corresponding to the at least one of the plurality of fire response scenarios based on a progress time of the at least one of the plurality of fire response scenarios, and displaying the calculated response capability information of the user.

According to another aspect, there is provided a VR-based fire response simulation method for secondary battery production performed by at least one processor, including receiving a gaze direction and gaze location of a user identified from a HMD, displaying fire response content associated with a secondary battery production apparatus corresponding to the received gaze direction and gaze location on an area of a display of the HMD, the fire response content including a plurality of fire response scenarios, obtaining user behavior information indicating a motion of the user determined from at least one of the HMD or a controller associated with the HMD, and executing the fire response content associated with the secondary battery production apparatus based on the obtained user behavior information.

According to an example embodiment, the method may further include, upon determining, based on the gaze direction and gaze location of the user, a gaze of the user at a predetermined location for a predetermined amount of time, determining that at least one of the plurality of fire response scenarios is resolved.

According to an example embodiment, the method may further include, upon determining, based on the user behavior information, an action associated with fire propagation is performed by the user, determining that at least one of the plurality of fire response scenarios is resolved.

According to an example embodiment, the method may further include, upon determining, based on the user behavior information, a touch of the user at a predetermined area, determining that at least one of the plurality of fire response scenarios is resolved.

According to an example embodiment, the method may further include, upon determining at least one of the plurality of fire response scenarios is completed, displaying question information associated with the at least one of the plurality of fire response scenarios, and receiving a response to the question information.

According to an example embodiment, the method may further include determining whether the user satisfies a guide condition based on the gaze direction and gaze location of the user, and upon determining that the user satisfies the guide condition, displaying user guide information associated with at least one of the plurality of fire response scenarios.

According to an example embodiment, the method may further include determining whether at least one of the plurality of fire response scenarios is completed by the user, upon determining the at least one of the plurality of fire response scenarios is completed, calculating response capability information of the user corresponding to the at least one of the plurality of fire response scenarios based on a progress time of the at least one of the plurality of fire response scenarios, and displaying the calculated response capability information of the user.

According another aspect, a non-transitory computer-readable medium storing instructions for executing a virtual reality (VR)-based fire response simulation for secondary battery production may be provided. The instructions, when executed by one or more processors, may cause the one or more processors to perform operations including: receiving a gaze direction and gaze location of a user identified from a head mounted display (HMD); displaying fire response content associated with a secondary battery production apparatus corresponding to the received gaze direction and gaze location on an area of a display of the HMD, the fire response content comprising a plurality of fire response scenarios; obtaining user behavior information indicating a motion of the user determined from at least one of the HMD or a controller associated with the HMD; and executing the fire response content associated with the secondary battery production apparatus based on the obtained user behavior information.

In various example embodiments of the present disclosure, the user performing secondary battery production may perform training associated with a response method in case of a fire in a secondary battery production facility through the simulation device before being put into work, and by training the user in this way, it is possible to minimize damage in case of a fire.

In various example embodiments of the present disclosure, the simulation device may generate and provide fire response scenarios associated with various emergency situations to the user, and accordingly, the user may effectively learn a response plan according to each fire situation.

In various example embodiments of the present disclosure, even when the user does not know how to respond to a fire response scenario, training on a response method in a fire situation using user guide information may be performed effectively.

The effect of the present disclosure is not limited to the above-mentioned effects, and other effects not mentioned will be apparent to those of ordinary skill in the art (referred to as "those skilled in the art") from the description of the claims.

BRIEF DESCRIPTION OF THE DRAWINGS

Embodiments of the present disclosure will be described with reference to the accompanying drawings described below, in which like reference numerals denote like elements, but are not limited thereto.

FIG. 11 illustrates an exemplary computing device for performing the above-described method and/or embodiment, and the like.

DETAILED DESCRIPTION

Figure 1:
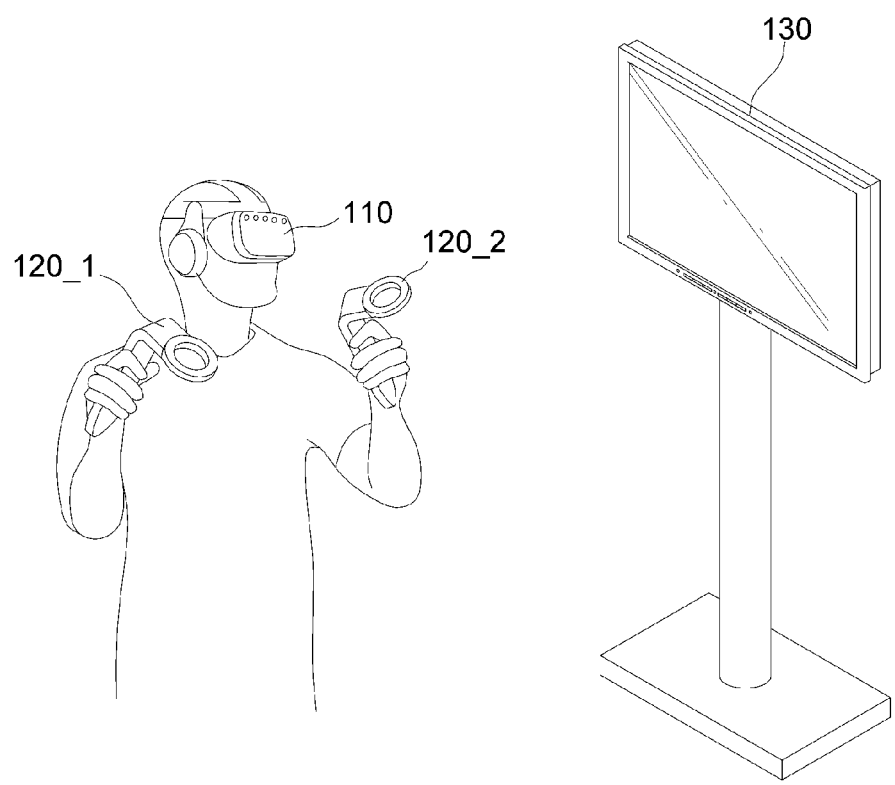
FIG. 1 is a diagram illustrating an example in which a user uses a VR-based simulation device according to an example embodiment.

Hereinafter, example embodiments will be described in detail with reference to the accompanying drawings. However, in the following description, if there is a concern of unnecessarily obscuring the gist of the present disclosure, detailed descriptions of well-known functions or configurations will be omitted.

When describing the example embodiments with reference to the accompanying drawings, like reference numerals refer to like components and a repeated description related thereto will be omitted. In addition, in the description of the example embodiments below, overlapping description of the same or corresponding components may be omitted. However, even if description regarding components is omitted, it is not intended that such components are not included in any example embodiment.

Advantages and features of the example embodiments disclosed herein, and methods of achieving them, will become apparent with reference to the example embodiments described below in conjunction with the accompanying drawings. However, the present disclosure is not limited to the example embodiments disclosed below, but may be implemented in various different forms, and the example embodiments are provided merely to fully inform those skilled in the art related to the present disclosure the scope of the disclosure.

Terms used herein will be briefly described, and the disclosed example embodiments will be described in detail. The terms used herein have been selected as currently widely used general terms as possible while considering the functions in the present disclosure, but these may vary depending on the intention, precedent, or emergence of new technology of those of ordinary skill in the relevant field. In addition, in a specific case, there is a term arbitrarily selected by the applicant, and in this case, the meaning will be described in detail in the description of the corresponding disclosure. Therefore, the terms used herein should be defined based on the meaning of the term and the overall contents of the present disclosure, rather than the simple name of the term.

Expressions in the singular herein include plural expressions unless the context clearly dictates the singular. As used herein, the plural forms are intended to include the singular forms as well, unless the context clearly indicates otherwise. As used herein, when a part includes a certain component, this means that other components may be further included, rather than excluding other components, unless otherwise stated.

It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

When it is mentioned that one component is "coupled", "combined", "connected", "associated", or "react" to any other component, the particular component may be directly coupled, combined, connected, associated and/or react to another component, but is not limited thereto. For example, there may be one or more intermediate components between a particular component and another component. As used herein, the term "and/or" includes any one and any combination of any two or more of the associated listed items.

Although terms of "first," "second," and the like are used to explain various components, the components are not limited to such terms. For example, a first component may be referred to as a second component, or similarly, the second component may be referred to as the first component within the scope of the present disclosure.

As used herein, a "secondary battery" may refer to a battery made by using a material in which an oxidation-reduction process between an electric current and a material may be repeated several times. For example, to produce a secondary battery, mixing, coating, roll pressing, slitting, notching and drying, lamination, folding and stacking, lamination and stacking, packaging, charging/discharging, degassing, characteristic inspection, etc., may be performed. In this case, separate production equipment (apparatus) for performing each process may be used. Here, each production equipment may be operated according to adjustment parameters and set values set or changed by the user.

As used herein, a "user" may refer to a worker who performs secondary battery production and operates secondary battery production equipment, and may include users training through a simulation device (e.g., a VR-based simulation device) for secondary battery production equipment. In addition, a "user account" is an ID created to use the simulation device or assigned to each user, and the user may log-in on the simulation device using the user account and perform the simulation, but is not limited thereto.

As used herein, a "user behavior information" may include a user input for setting or changing conditions and/or values of at least some of the adjustment parameters, or information generated by a predetermined algorithm based on the user input. In addition, the user behavior information may include a user input such as a touch input, a drag input, a pinch input, a rotation input performed on at least a partial region of the virtual secondary battery production apparatus, or may be information generated by a predetermined algorithm based on a corresponding user input.

As used herein, a "fire response content" may include, but is not limited to, virtual reality (VR)-based content about a fire situation and/or response method that may occur in a secondary battery production facility. For example, the fire response content may be composed of augmented reality (AR) and/or mixed reality (MR)-based content. According to an example embodiment, the fire response content may include a plurality of fire response scenarios corresponding to each fire situation and/or response method. In addition, a plurality of fire response scenarios may be composed of a plurality of detailed operations, such as a plurality of fire propagation operations, a safety assurance operation, an initial response operation, and an inspection operation after completion. In addition, the plurality of detailed operations may include a plurality of missions to be performed by the user (e.g., reporting a fire, wearing an oxygen mask, automatic/manual operation of bubble, etc.). In addition, as used herein, "at least some of a plurality of fire response scenarios" may refer to some of each fire response scenario or some of a plurality of detailed operations included in the fire response scenario.

In the present disclosure, the fire response content may include a training mode and an evaluation mode. For example, user guide information may be provided to a user conducting a simulation in the training mode, but user guide information may not be provided in the evaluation mode. In another example, a test result for a user conducting a simulation may be provided in the evaluation mode, the test result may not be provided but in the training mode.

FIG. 1 is a diagram illustrating an example in which a user uses a VR-based simulation device according to an example embodiment. As shown, a user may use a simulation device using a head mounted display (HMD) 110 and two controllers 120_1, 120_2. Here, the simulation device (not shown) is a device for training a secondary battery production worker (e.g., a user), and may be a device for communicating with the HMD 110, the controller 120, etc., to obtain user behavior information, and to provide VR-based fire response content (e.g., images, videos, animations, etc.) that is executed or changed according to the obtained user behavior information. For example, a user may train a response method in case of a fire in a secondary battery production facility, etc., by using a simulation device that implements a real secondary battery production facility in VR.

According to an example embodiment, the simulation device may receive the user's gaze direction and gaze location identified from the HMD 110, and display fire response content associated with the secondary battery production apparatus corresponding to the gaze direction and gaze location received based on the area on the display of the HMD 110. Here, the HMD 110 may be a display device worn on the head and used, and may include various components, for example, one or more camera sensors, a gyro sensor, an acceleration sensor, a microphone, a speaker, a button using a touch panel, an input/output port, and a vibrator for vibration. In other words, the HMD 110 may estimate the user's head movement and/or gaze direction using such various sensors, or estimate the user's gaze location, gaze depth and the like using a camera sensor and the like that tracks the user's eye movement. In addition, the content associated with the secondary battery production apparatus may refer to content implemented in virtual reality of a real secondary battery production plant and/or equipment. In other words, the user may be provided with a feeling similar to performing work in the real secondary battery production plant through the content output through the HMD 110. Additionally, content associated with the secondary battery production apparatus according to the user's head movement and/or gaze direction may be output or displayed together on the separate monitor 130.

According to an example embodiment, the simulation device may obtain user behavior information indicating the user's motion determined from at least one of the HMD 110 and the controller 120 associated with the HMD 110, and execute the fire response content associated with the secondary battery production apparatus based on the obtained user behavior information. Here, the HMD 110 and/or the controller 120 may include various components such as a gyro sensor, an acceleration sensor, a button using a touch panel, an input/output port, a vibrator for vibration and the like for tracking and reflecting the user's hand gesture, shape and the like using the VR-based fire response content, but is not limited thereto. In other words, the HMD 110 and/or the controller 120 may estimate the user's motion by using these various sensors, and the simulation device may execute content associated with the VR-based fire situation by obtaining user behavior information indicating the user's motion.

According to an example embodiment, the user may use VR-based fire response content associated with the secondary battery production apparatus to train or learn a response method to a fire during secondary battery production. Here, the fire response content may include a plurality of fire response scenarios. In addition, the plurality of fire response scenarios may be scenarios associated with a series of processes from the occurrence of a fire to the end of the situation after responding to a fire and/or necessary actions by the user. For example, a plurality of fire response scenarios may include a cell ignition scenario in a charging/discharging box, a charging/discharging mechanism part/power part ignition scenario, a room temperature/high temperature aging standard scenario, a room temperature/high temperature aging fire early termination scenario, a shipment aging bubble normal operation scenario, a shipment aging bubble manual operation scenario, and the like.

According to an example embodiment, each fire response scenario may be composed of a fire recognition operation, a fire propagation operation, a safety assurance operation, an initial response operation, an inspection operation after completion, and the like. In this case, the user's action (e.g., user behavior information) required to resolve each operation may be determined differently for each fire response scenario. For example, for scenarios associated with aging (e.g., room temperature/high temperature aging standard scenario, room temperature/high temperature aging fire early termination scenario, shipment aging bubble normal operation scenario, shipment aging bubble manual operation scenario, etc.), automatic and/or manual operation of the bubble of the user may be required for scenario resolution, and for scenarios associated with charging and discharging (e.g., cell ignition scenario in a charging/discharging box, charging/discharging mechanism part/power part ignition scenario, etc.), a user's action to suppress a fire with a hose reel and/or a $CO_2$ fire extinguisher may be required for scenario resolution.

According to an example embodiment, the simulation device may determine the degree of suppression of the fire and/or whether to suppress the fire by using the user behavior information obtained based on the user's action. For example, the simulation device may determine the degree and/or suppression of the fire by using whether the user performs a specific action, whether the user performs the motion based on a predetermined order and time range, and the like. In other words, the simulation device may obtain user behavior information associated with the user's action, and adaptively determine the degree of suppression and/or suppression of the fire according to the obtained user behavior information.

In FIG. 1, it is illustrated that one user uses the simulation device, but the present disclosure is not limited thereto, and a plurality of users may use the simulation device at the same time. With such a configuration, a user performing secondary battery production may perform training related to a response method in case of a fire in a secondary battery production facility through a simulation device before being put into work, and by training the user in this way, damage may be minimized in case of a fire.

Figure 2:
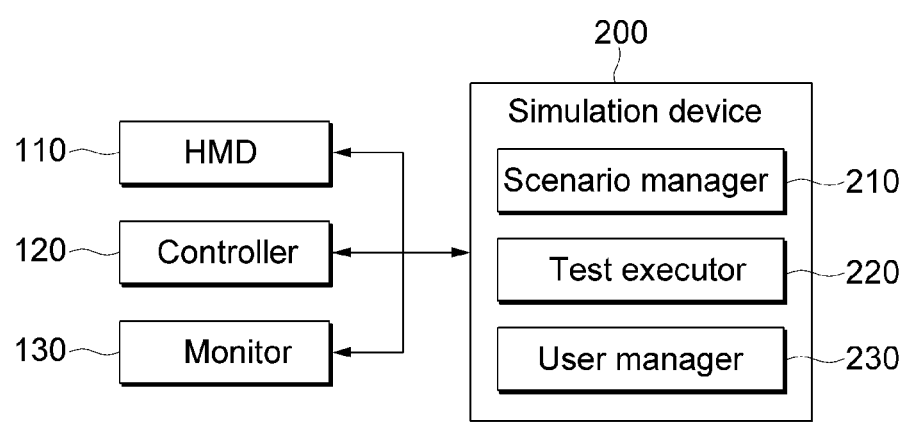
FIG. 2 is a functional block diagram illustrating an internal configuration of a simulation device according to an example embodiment.

FIG. 2 is a functional block diagram illustrating an internal configuration of a simulation device 200 according to an example embodiment. As shown, the simulation device 200 may include a scenario manager 210, a test performer 220, a user manager 230, and the like, but is not limited thereto. The simulation device 200 may communicate with the HMD 110, the controller 120, the monitor 130, and the like, and may exchange data and/or information associated with VR-based fire response content.

According to an example embodiment, the scenario manager 210 may determine one or more fir response scenarios among a plurality of fire response scenarios associated with the secondary battery production apparatus, and change the fire response content associated with the secondary battery production apparatus based on the determined one or more fire response scenarios. For example, when the shipment aging bubble manual operation scenario is determined to be a fire response scenario, the scenario manager 210 may change the fire response content based on images, videos, animations, etc., associated with the manual operation of the bubble.

According to an example embodiment, when a fire response scenario occurs, the user may perform an arbitrary action on the VR to resolve the fire response scenario. In this case, the scenario manager 210 may receive user behavior information for solving one or more determined fire response scenarios, and determine and/or correct whether fire is suppressed and/or suppression degree based on the received user behavior information. For example, when the fire response scenario includes a shipment aging bubble manual operation scenario, the fire point aiming accuracy may be calculated based on user behavior information, and whether the fire is suppressed and/or the degree of suppression of the fire using the calculated fire point aiming accuracy may be determined and/or corrected.

According to an example embodiment, when the user performs the actions corresponding to each fire response scenario in a predetermined order and with an accuracy greater than or equal to a predetermined criterion, the scenario manager 210 may determine that the fire response scenario is resolved. For example, when the shipment aging bubble manual operation scenario occurs, the user may sequentially perform actions such as i) propagate the fire by reporting a fire after recognizing the fire, ii) wearing an oxygen mask and shutting off the switchboard power to ensure safety, iii) manipulating the aiming point of the bubble through the bubble management monitor to fire the bubble at the fire point. In this case, the scenario manager 210 may determine whether the fire response scenario is resolved based on whether a series of actions are performed in a predetermined order based on the user behavior information and whether the fire point aiming is performed with high accuracy.

According to an example embodiment, the test performer 220 may determine whether one or more fire response scenarios are resolved, and when it is determined that one or more fire response scenarios are resolved, may calculate the progress time of one or more fire response scenarios, the amount of damage caused by the fire, and the like while the one or more fire response scenarios are in progress. For example, the amount of damage may be calculated through a predetermined algorithm based on the user's response time, a value input by the user, the user's response order, response accuracy, and the like. In addition, the test performer 220 may generate response capability information of the user account based on the calculated progress time and the amount of damage generated. Here, the user account may refer to an account of a worker using the simulation device 200, and the response capability information is information indicating the fire response skill of the user, and may include response speed, loss amount, evaluation score, etc. Additionally, when the corresponding user resolves all predetermined types of fire response scenarios, the test performer 220 may determine whether the user passes the simulation training based on response capability information for each fire response scenario.

The user manager 230 may perform managing registration, modification, deletion, etc., of a user account associated with a user who uses the simulation device 200. According to an example embodiment, the user may use the simulation device 200 using his/her registered user account. In this case, the user manager 230 may store and manage whether each fire response scenario is resolved for each user account and response capability information corresponding to each fire response scenario in an arbitrary database. Using the information stored by the user manager 230, the scenario manager 210 may extract information associated with a specific user account stored in the database, and may extract or determine at least one scenario among a plurality of fire response scenarios based on the extracted information. For example, the scenario manager 210 may extract and generate only a fire response scenario in which the response speed is lower than the average response speed based on the information associated with the user account or provide it to the user, but is not limited thereto, and the fire response scenario may be extracted or determined by any other criteria or combination of any criteria.

In FIG. 2, each functional configuration included in the simulation device 200 is described separately, but this is only to help the understanding of the disclosure, and one computing device may perform two or more functions. With such a configuration, the simulation device 200 may generate and provide fire response scenarios associated with various emergency situations to the user, and accordingly, the user may effectively learn a response plan according to each fire situation.

Figure 3:
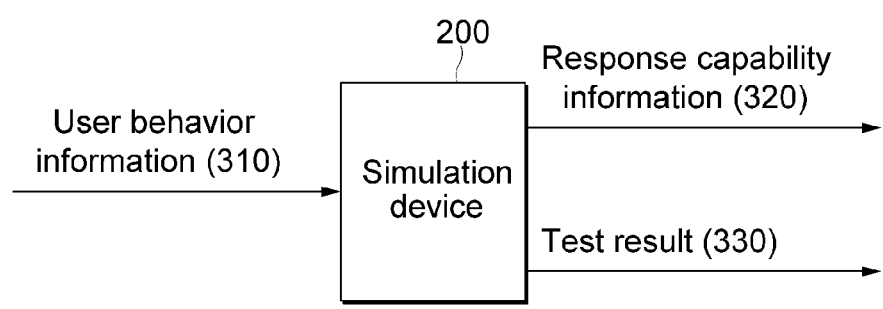
FIG. 3 is a diagram illustrating an example in which response capability information and test results are generated according to an example embodiment.

FIG. 3 is a diagram illustrating an example in which response capability information 320 and test results 330 are generated according to an example embodiment. As described above, when a fire response scenario occurs, the simulation device 200 may receive user behavior information 310 from the user, etc., and determine whether the fire response scenario is resolved based on the received user behavior information 310 or the like.

According to an example embodiment, when it is determined that the fire response scenario is resolved, the simulation device 200 may calculate the progress time and loss value of the fire response scenario while the fire response scenario is in progress, and generate response capability information 320 for the fire situation of the user account based on the calculated progress time and loss value. Additionally or alternatively, the simulation device 200 may generate the response capability information 320 by further considering the level of human damage, loss value, degree of personal damage, etc. according to the occurrence of a fire. In this case, the test result 330 may be output together with the corresponding capability information 320. For example, a user associated with the corresponding user account may perform a test for any fire response scenario, and when all fire response scenarios are resolved according to a predetermined criterion, the simulation device 200 may determine that the user has passed the simulation test for the fire situation.

Additionally or alternatively, the simulation device 200 may set the range of the fire based on user behavior information. For example, if the user does not perform a response in a predetermined order or does not perform a predetermined response within a predetermined time range (e.g., a mission associated with a fire response scenario, etc.), the simulation device 200 may expand the range of the fire that has occurred based on the elapsed degree of the corresponding time. In this case, the simulation device 200 may determine the extent of the fire by providing the increased range of fire, the amount of damage, the response time, etc., to an arbitrary algorithm and/or machine learning model.

Figure 4:
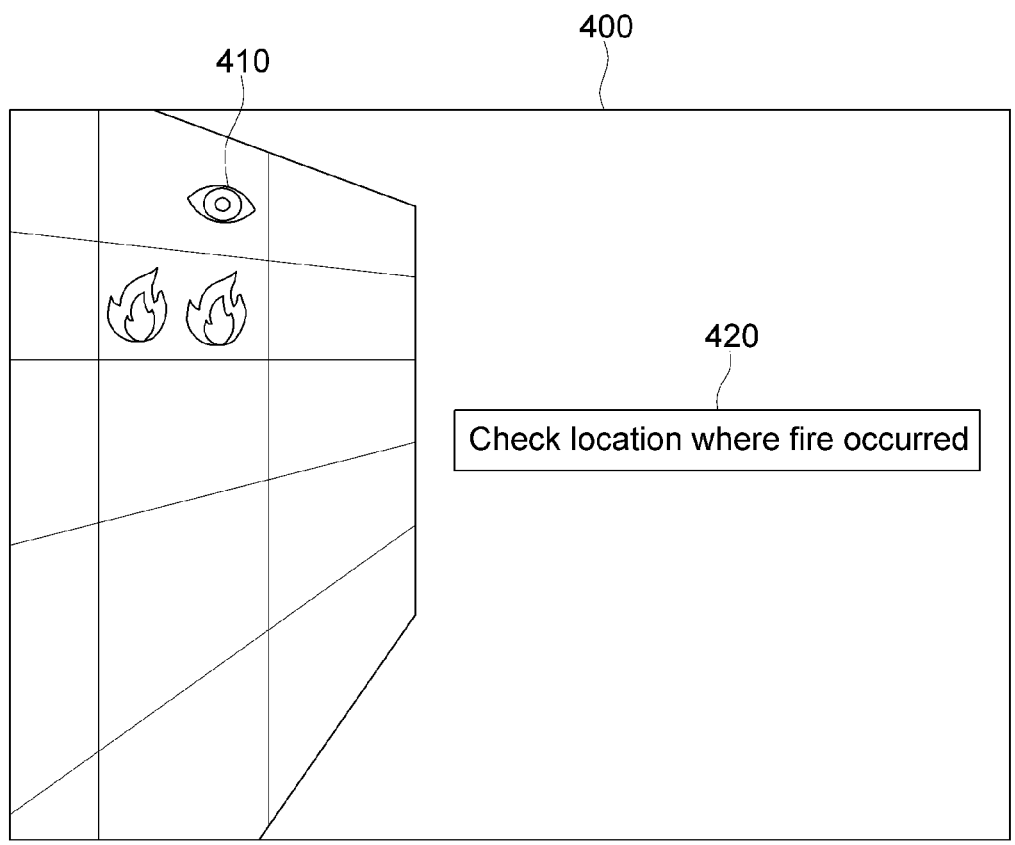
FIG. 4 is an exemplary diagram of a display screen illustrating a fire recognition process of VR-based fire response content according to an example embodiment.

FIG. 4 is an exemplary diagram of a display screen 400 illustrating a fire recognition process of VR-based fire response content according to an example embodiment. As described above, on the display screen 400 of the HMD, fire response content associated with the secondary battery production apparatus corresponding to the gaze direction and the gaze location of the user may be displayed. In this case, the content may be displayed together on any display device (e.g., a monitor) associated with the HMD.

According to an example embodiment, when it is determined that the user gazes at a predetermined specific location for a predetermined time based on the user's gaze direction and gaze location, the simulation device (200 of FIG. 2) may determine that at least some of the plurality of fire response scenarios are resolved. As illustrated, when a fire response scenario occurs, the user may perform an action for recognizing the location where the fire occurred. In the illustrated example, the user may move to the location where the fire occurred and gaze at the area where the fire occurred (e.g., a specific location) for a predetermined time. When the user gazes at the area where the fire has occurred, a gaze icon 410 may be displayed on the display. In other words, when the user gazes at the area where the fire occurred for a predetermined time, it may be determined that the fire recognition process associated with the fire response scenario is resolved.

According to an example embodiment, the simulation device determines whether the user satisfies the guide condition based on the user's gaze direction and gaze location, and when it is determined that the user satisfies the guide condition, user guide information 420 associated with a plurality of fire response scenarios may be displayed. For example, the simulation device may determine that the guide condition is satisfied when the user is within a predetermined distance from the location of the fire and/or if the user gazes at the location of the fire, but is not limited thereto. In the illustrated example, the user guide information 420 may include a guide message such as "Check the location where the fire occurred." With this configuration, even if the user does not know the response method for a fire response scenario, it is possible to effectively train for a response method in a fire situation using the user guide information 420.

Figure 5:
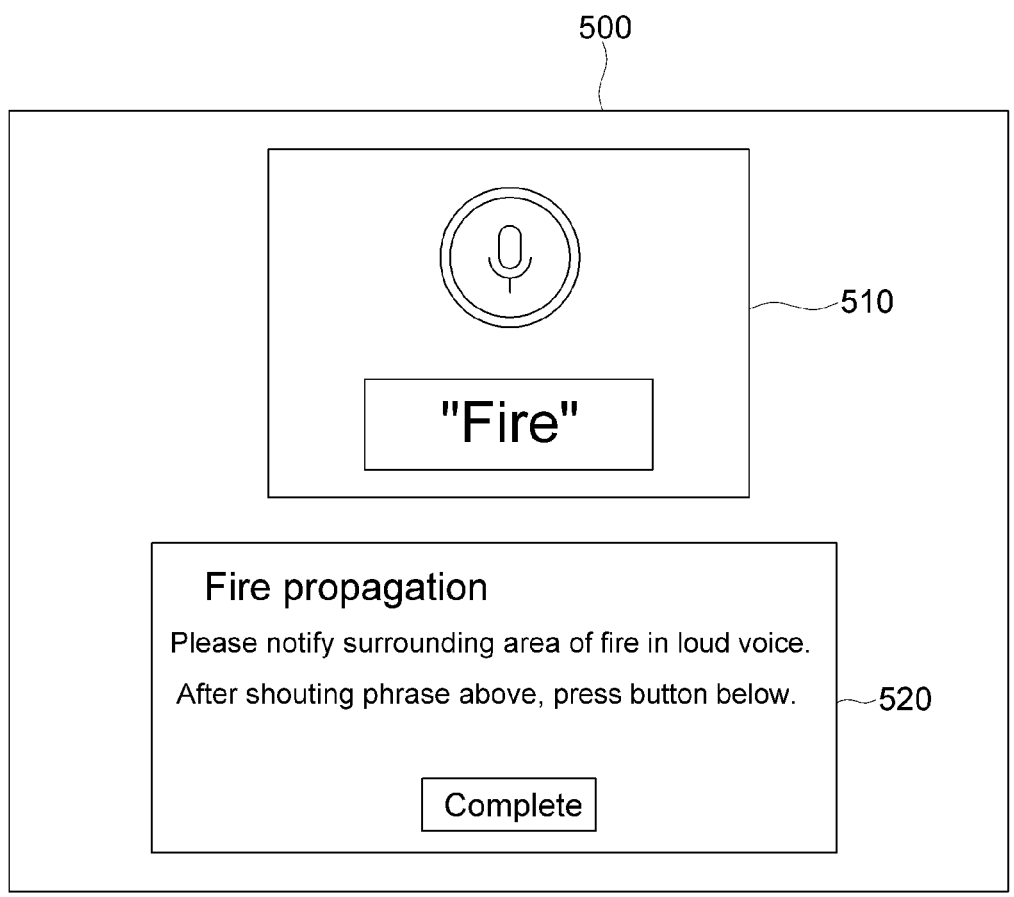
FIG. 5 is an exemplary diagram of a display screen illustrating a fire propagation process of VR-based fire response content according to an example embodiment.

FIG. 5 is an exemplary diagram of a display screen 500 illustrating a fire propagation process of VR-based fire response content according to an example embodiment. As described above, on the display screen 500 of the HMD, fire response content associated with the secondary battery production apparatus corresponding to the gaze direction and the gaze location of the user may be displayed. In this case, the content may be displayed together on an arbitrary display device (e.g., monitor (130 in FIG. 1)) associated with the HMD.

According to an example embodiment, when it is determined that the user performs a specific action associated with fire propagation based on the user behavior information, the simulation device (200 of FIG. 2) may determine that at least some of the plurality of fire response scenarios are resolved. As illustrated, when a fire response scenario occurs, the user may perform an action for propagating the fact that a fire has occurred. In the illustrated example, a voice icon 510 for inducing a user's voice may be displayed on the display. In this case, the user may check the voice icon 510 and make a sound such as "Fire!" to propagate the fact that a fire has occurred. In this case, the user guide information 520 associated with the fire response scenario may be displayed, for example, user guide information 520 may include a guide message such as "Fire propagation, please notify the surrounding area of the fire in a loud voice." Then, the user may perform an action for fire propagation according to the user guide information 520 and select a confirmation button displayed in association with the user guide information 520 by touch input, etc., to resolve a fire response scenario associated with fire propagation.

Figure 6:
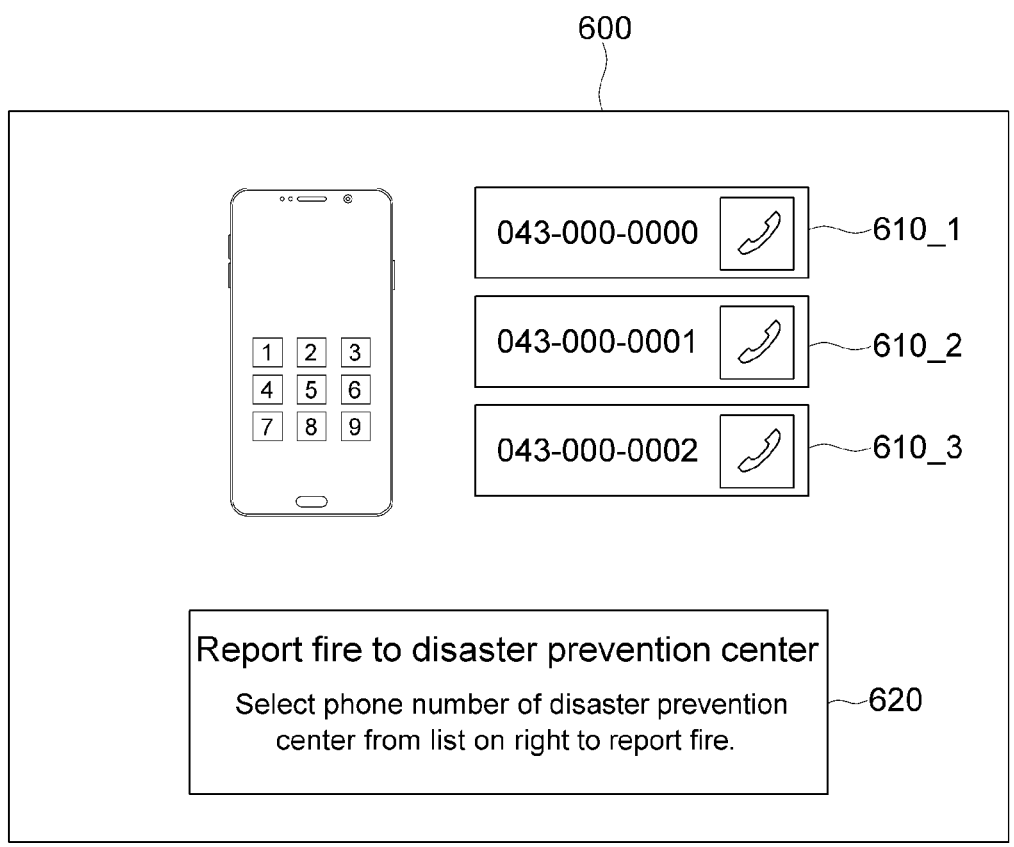
FIG. 6 is an exemplary diagram of a display screen illustrating an additional fire propagation process of VR-based fire response content according to an example embodiment.

FIG. 6 is an exemplary diagram of a display screen 600 illustrating an additional fire propagation process of VR-based fire response content according to an example embodiment. As described above, on the display screen 600 of the HMD, fire response content associated with the secondary battery production apparatus corresponding to the gaze direction and the gaze location of the user may be displayed. In this case, the content may be displayed together on any display device (e.g., monitor) associated with the HMD.

According to an example embodiment, when it is determined that the user touches a predetermined specific area based on the user behavior information, the simulation device (200 of FIG. 2) may determine that at least some of the plurality of fire response scenarios are resolved. As illustrated, when a fire response scenario occurs, the user may perform an action for propagating the fact that a fire has occurred. In the illustrated example, a smartphone image for inducing a virtual fire report situation, report numbers 610_1, 610_2, 610_3, and the like may be displayed on the display. In this case, the user may select one of the report numbers 610_1, 610_2, and 610_3 through a touch input to propagate the fact that a fire has occurred. Here, the user guide information 620 associated with the fire response scenario may be displayed, and for example, the user guide information 620 may include a guide message such as "Report a fire to the disaster prevention center, select a phone number of the disaster prevention center from the list on the right to report a fire."

According to an example embodiment, when the user selects a phone number corresponding to the disaster prevention center among the report numbers 610_1, 610_2, and 610_3 displayed on the display by touch input, at least some of a plurality of fire response scenarios may be determined to be resolved. In FIG. 6, it is shown that the user selects one of the plurality of report numbers 610_1, 610_2, 610_3 with a touch input to perform a fire propagation action, but is not limited thereto, and the user may perform a fire propagation operation by directly selecting a number corresponding to the disaster prevention center on the smartphone image through a touch input or the like.

Figure 7:
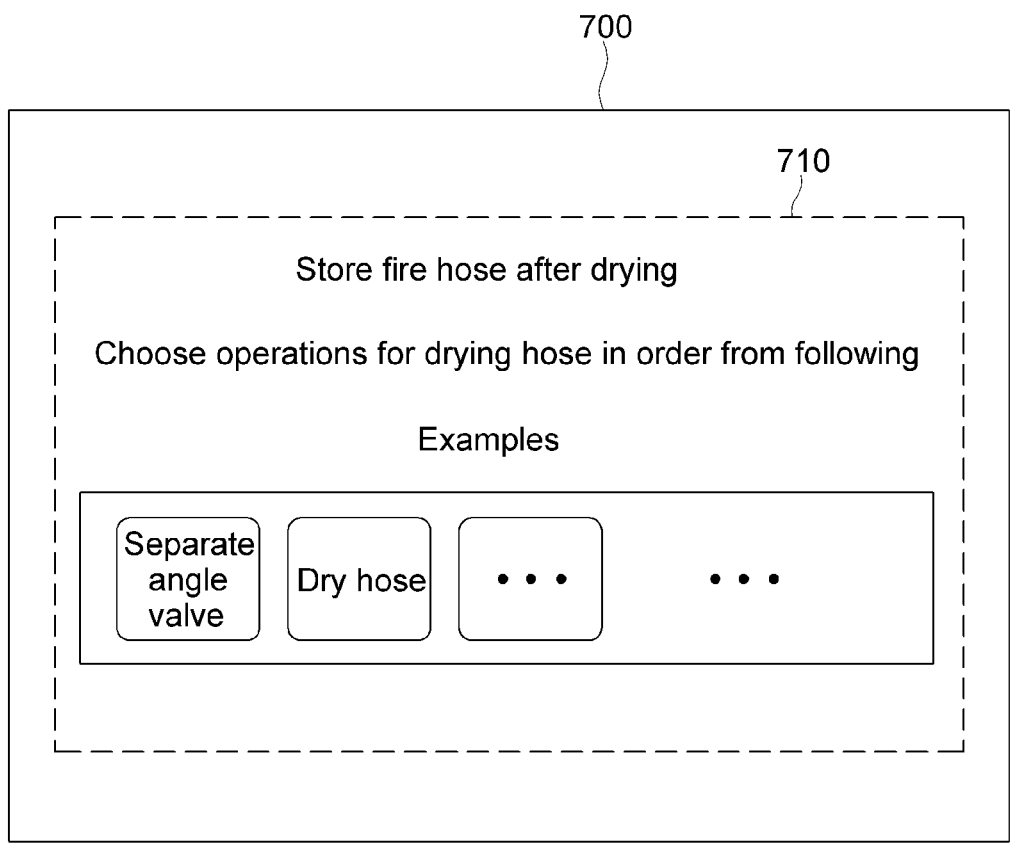
FIG. 7 is an exemplary diagram of a display screen on which question information associated with a fire response scenario is displayed according to an example embodiment.

FIG. 7 is an exemplary diagram of a display screen 700 on which question information 710 associated with a fire response scenario is displayed according to an example embodiment. According to an example embodiment, when it is determined that at least some of the plurality of fire response scenarios are completed, the simulation device 200 (200 of FIG. 2) may display one or more question information associated with at least some of the plurality of fire response scenarios. In addition, the simulation device may receive a response to one or more question information displayed from the user.

In the illustrated example, when the fire response scenario includes a shipment aging bubble manual operation scenario, question information 710 on how to store the fire hose after drying may be displayed on the display of the HMD and/or display device (e.g., monitor). In this case, the user may perform a response to the corresponding question information 710 by sequentially selecting the displayed blocks such as "separate angle valve" and "dry hose" by a touch input or the like.

In FIG. 7, the question information 710 for determining the order of the blocks is shown to be displayed on the display, but the question type is not limited thereto, and OX type questions, multiple choice questions, subjective questions, etc., may be displayed on the display. In addition, in FIG. 7, when it is determined that at least some of a plurality of fire response scenarios are completed, one question information 710 is shown to be displayed on the display, but is not limited thereto, and a plurality of question information may be sequentially displayed on the display. When the user performs response to all the question information sequentially provided in this way, the result of the response and/or the percentage of correct answers may be displayed on the display.

Figure 8:
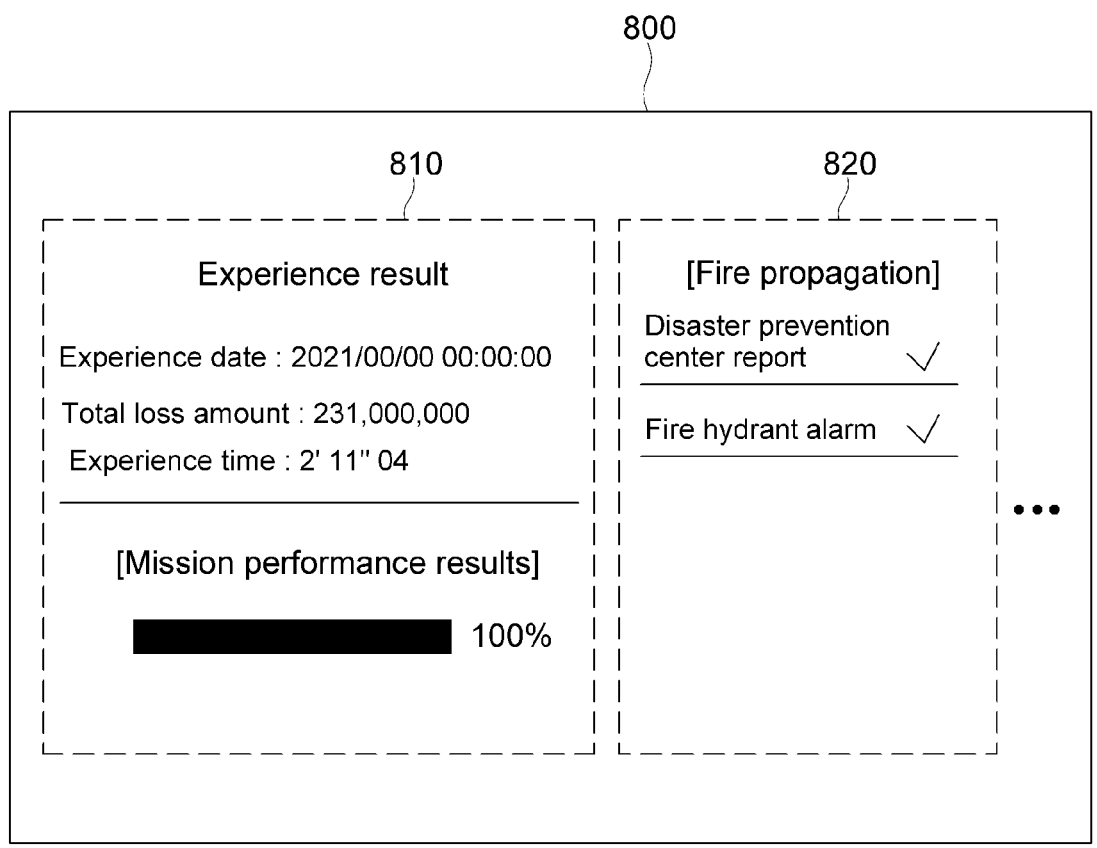
FIG. 8 is an exemplary diagram of a display screen on which response capability information is displayed according to an example embodiment.

FIG. 8 is an exemplary diagram of a display screen 800 on which response capability information 810 is displayed according to an example embodiment. According to an example embodiment, the simulation device (200 in FIG. 2) determines whether the fire response content is completed by the user, and when it is determined that at least some of the plurality of fire response scenarios are completed, may calculate the user's response capability information 810 corresponding to at least some of the plurality of fire response scenarios based on the progress time of at least some of the plurality of fire response scenarios. In addition, the simulation device may display the calculated user's response capability information 810 on the display of the HMD. In this case, the mission performance information 820 of each operation associated with the fire response scenario may be displayed on the display of the HMD together with the response capability information 810.

In the illustrated example, when the fire response scenario includes a cell ignition scenario in the charge/discharge box, the response capability information 810 including the experience date of the corresponding fire response scenario, the calculated total loss amount, experience time (response time), mission performance results, etc., may be displayed on a display of the HMD and/or a display device (e.g., a monitor). Here, the loss amount (e.g., amount of damage) may be calculated by an arbitrary algorithm and/or machine learning model based on the user's response time, the value input by the user, the user's response order, response accuracy, and the like. In addition, the mission performance result may indicate whether the user has performed a mission necessary to resolve each operation (e.g., fire propagation operation, safety assurance operation, initial response operation, inspection operation after completion, etc.) corresponding to the fire response scenario according to a predetermined criterion.

In FIG. 8, the response capability information 810 is illustrated as including the total loss amount, experience time, and mission performance result, but is not limited thereto, and the response capability information 810 may further include a user's evaluation score calculated using a loss amount and/or experience time.

Figure 9:
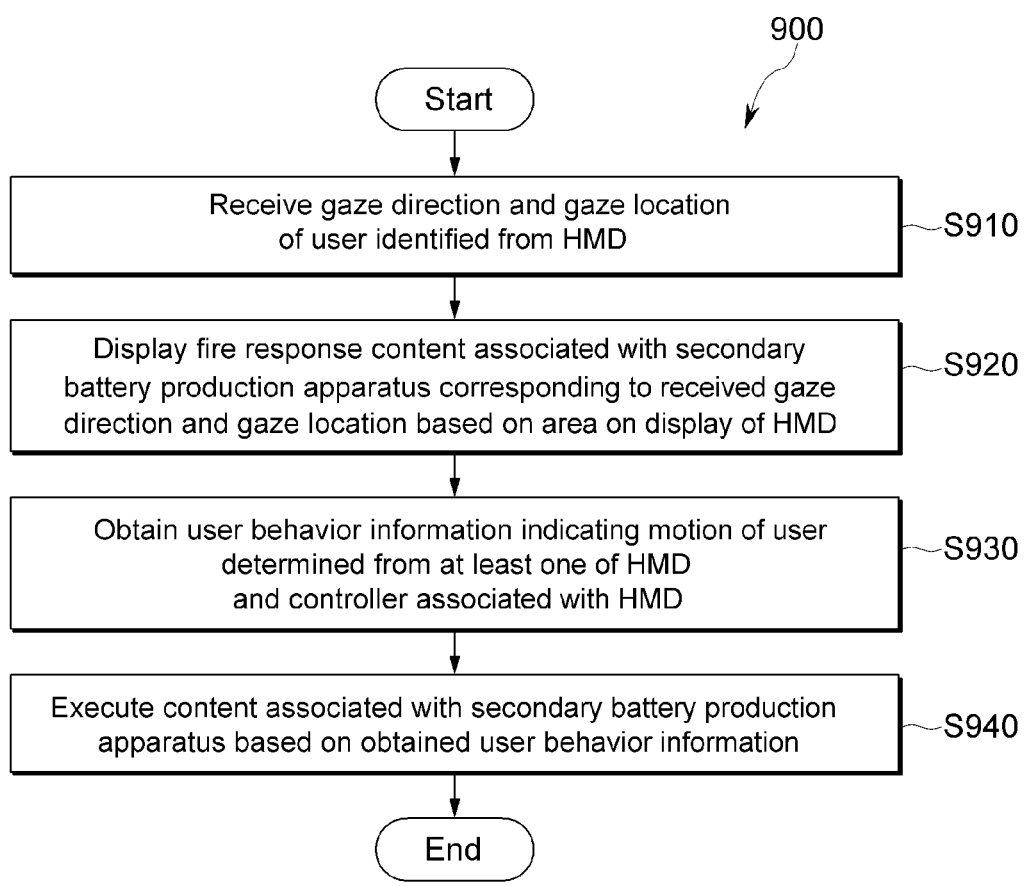
FIG. 9 is a diagram illustrating an example of a VR-based fire response simulation method for secondary battery production according to an example embodiment.

FIG. 9 is a diagram illustrating an example of a VR-based fire response simulation method 900 for secondary battery production according to an example embodiment. The VR-based fire response simulation method 900 for secondary battery production may be performed by a processor (e.g., at least one processor of a simulation device). As shown, the VR-based fire response simulation method 900 for secondary battery production may be started by the processor receiving the gaze direction and gaze location of the user identified from the HMD (S910).

The processor may display fire response content associated with the secondary battery production apparatus corresponding to the received gaze direction and gaze location based on the area on the display of the HMD (S920). In this case, the content may be displayed together on any monitor (display device) associated with the HMD.

The processor may obtain user behavior information indicating the motion of the user determined from at least one of the HMD and the controller associated with the HMD (S930). In addition, the processor may execute fire response content associated with the secondary battery production apparatus based on the obtained user behavior information (S940). According to an example embodiment, the processor may determine one or more fire response scenarios among a plurality of fire response scenarios associated with the secondary battery production apparatus, and change fire response content associated with the secondary battery production apparatus based on the determined one or more fire response scenarios.

Figure 10:
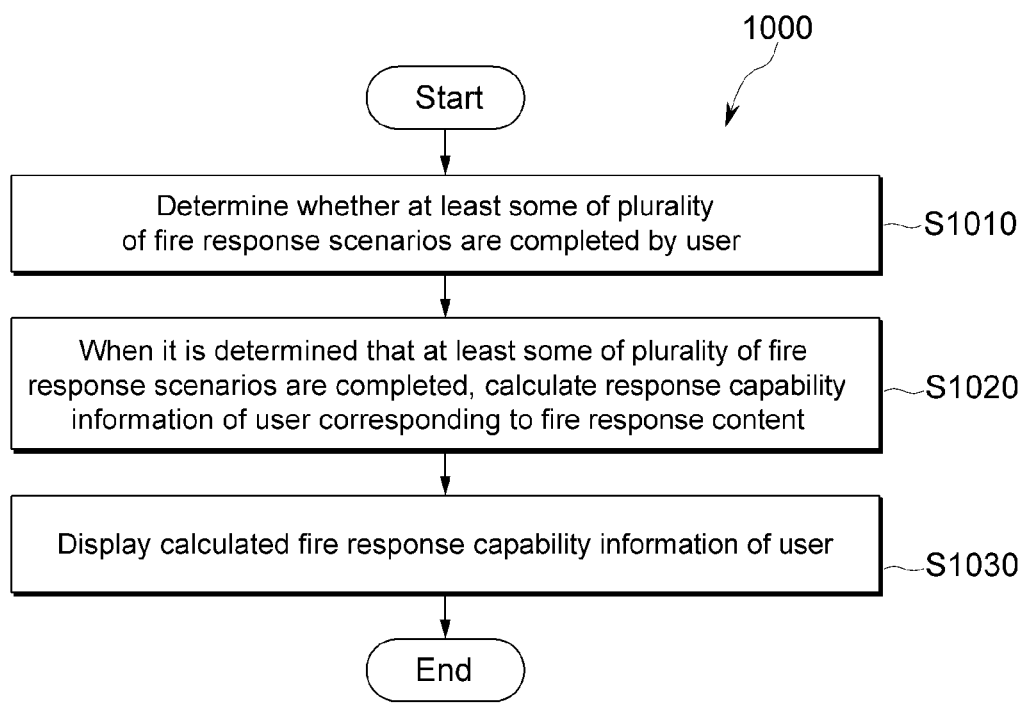
FIG. 10 is a diagram illustrating an example of a test result calculation method according to an example embodiment.

FIG. 10 is a diagram illustrating an example of a test result calculation method 1000 according to an example embodiment. The test result calculation method 1000 may be performed by a processor (e.g., at least one processor of the simulation device). As shown, in the test result calculation method 1000, the processor may determine whether at least some of a plurality of fire response scenarios associated with the secondary battery production apparatus are completed by the user (S1010).

When it is determined that at least some of the plurality of fire response scenarios are completed, the processor may calculate response capability information of the user corresponding to at least some of the plurality of completed fire response scenarios (S1020). In addition, the processor may display the calculated fire response capability information of the user together with fire response content associated with the secondary battery production apparatus (S1030). For example, the processor may calculate operation capability information by inputting the user's action sequence, action accuracy, response time, etc., to an arbitrary algorithm, machine learning model, etc., but is not limited thereto.

Figure 11:
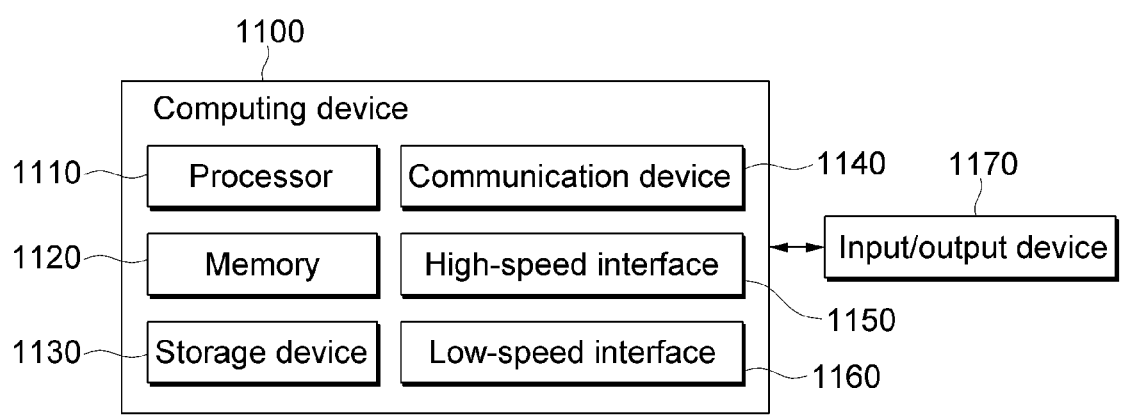

FIG. 11 is a diagram illustrating an exemplary computing device 1100 for performing the above-described method and/or example embodiment, and the like. According to an example embodiment, the computing device 1100 may be implemented using hardware and/or software configured to interact with a user. Here, the computing device 1100 may include the above-described simulation device (200 in FIG. 2). For example, the computing device 1100 may be configured to support a virtual reality (VR), augmented reality (AR), or mixed reality (MR) environment, but is not limited thereto. The computing device 1100 may include a laptop, a desktop, a workstation, a personal digital assistant, a server, a blade server, a main frame, etc., but is not limited thereto. The components of computing device 1100 described above, their connection relationships, and their functions are intended to be illustrative, and not intended to limit the implementations of the disclosure described and/or claimed herein.

The computing device 1100 includes a processor 1110, a memory 1120, a storage device 1130, a communication device 1140, a high-speed interface 1150 connected to the memory 1120 and high-speed expansion port, and a low-speed interface 1160 connected to the low-speed bus and storage device. Each of the components 1110, 1120, 1130, 1140, and 1150 may be interconnected using a variety of buses, mounted on the same main board, or mounted and connected in another suitable manner. The processor 1110 may be configured to process instructions of a computer program by performing basic arithmetic, logic, and input/output operations. For example, the processor 1110 may process instructions stored in the memory 1120, storage device 1130, etc., and/or instructions executed within the computing device 1100 to display graphic information on an external input/output device 1170, such as a display device connected to the high-speed interface 1150.

The communication device 1140 may provide a configuration or function for the input/output device 1170 and the computing device 1100 to communicate with each other through a network, and may provide a configuration or function for supporting the input/output device 1170 and/or the computing device 1100 to communicate with other external devices, etc. For example, a request or data generated by a processor of an external apparatus according to an arbitrary program code may be transmitted to the computing device 1100 through a network under the control of the communication device 1140. Conversely, a control signal or instruction provided under the control of the processor 1110 of the computing device 1100 may be transmitted to another external apparatus through the communication device 1140 and a network.

In FIG. 11, the computing device 1100 is illustrated as including one processor 1110, one memory 1120, and the like, but is not limited thereto, and the computing device 1100 may be implemented using a plurality of memories, a plurality of processors, and/or a plurality of buses, etc. In addition, although it has been described above that one computing device 1100 exists in FIG. 11, the present disclosure is not limited thereto, and a plurality of computing devices may interact and perform an operation necessary to execute the above-described method.

The memory 1120 may store information in the computing device 1100. According to an example embodiment, the memory 1120 may include a volatile memory unit or a plurality of memory units. Additionally or alternatively, the memory 1120 may include a non-volatile memory unit or a plurality of memory units. In addition, the memory 1120 may include another type of computer-readable medium, such as a magnetic disk or an optical disk. In addition, an operating system and at least one program code and/or instruction may be stored in the memory 1120.

The storage device 1130 may be one or more mass storage devices for storing data for computing device 1100. For example, the storage device 1130 may be a non-transitory computer-readable medium including magnetic discs such as hard disks, removable disks, optical discs, semiconductor memory devices such as erasable programmable read-only memory (EPROM), electrically erasable PROM (EEPROM), flash memory devices, CD-ROM and DVD-ROM, or may be configured to include such a non-transitory computer-readable medium. In addition, the computer program may be tangibly embodied in such a non-transitory computer-readable medium.

The high-speed interface 1150 and the low-speed interface 1160 may be means for interaction with the input/output device 1170. For example, input devices may include devices such as cameras, keyboards, microphones, mice, etc., including audio sensors and/or image sensors, and output devices may include devices such as displays, speakers, haptic feedback devices, and the like. In another example, the high-speed interface 1150 and the low-speed interface 1160 may be means for interfacing with a device in which a configuration or function for performing input and output, such as a touch screen, is integrated into one.

According to an example embodiment, while the high-speed interface 1150 manages bandwidth-intensive operations for computing device 1100, the low-speed interface 1160 may manage lower bandwidth intensive operations than the high-speed interface 1150, but such function assignment is merely exemplary. According to an example embodiment, the high-speed interface 1150 may be coupled to the memory 1120, the input/output device 1170, and high-speed expansion ports capable of accommodating various expansion cards (not shown). In addition, the low-speed interface 1160 may be coupled to the storage device 1130 and the low-speed expansion port. Additionally, the low-speed expansion port that may include various communication ports (e.g., USB, Bluetooth, Ethernet, Wireless Ethernet) may be coupled to one or more input/output devices 1170 such as a keyboard, a pointing device, a scanner, or a networking device such as a router, a switch, etc., through a network adapter or the like.

The computing device 1100 may be implemented in a number of different forms. For example, the computing device 1100 may be implemented as a standard server, or a group of such standard servers. Additionally or alternatively, the computing device 1100 may be implemented as part of a rack server system, or implemented as a personal computer, such as a laptop computer. In this case, components from the computing device 1100 may be coupled to other components in any mobile device (not shown). Such computing device 1100 may include, or be configured to communicate with, one or more other computing devices.

In FIG. 11, the input/output device 1170 is not included in the computing device 1100, but is not limited thereto, and may be configured as a single device with the computing device 1100. In addition, in FIG. 11, the high-speed interface 1150 and/or the low-speed interface 1160 is illustrated as an element configured separately from the processor 1110, but is not limited thereto, and the high-speed interface 1150 and/or the low-speed interface 1160 may be configured to be included in the processor.

The methods and/or various example embodiments as described above may be implemented in digital electronic circuitry, computer hardware, firmware, software, and/or combinations thereof. Example embodiments of the present disclosure may be implemented as a non-transitory computer-readable medium and/or a computer program stored in a non-transitory computer-readable medium or executed by a data processing apparatus, e.g., one or more programmable processors and/or one or more computing device. The computer program as described above may be written in any form of a programming language, including compiled or interpreted languages, and may be deployed in any form, including as a stand-alone program, a module, a subroutine, or the like. A computer program may be deployed through one computing device, multiple computing devices connected by the same network and/or multiple computing devices connected by a plurality of different networks.

The methods and/or various example embodiments as described above may be performed by one or more processors configured to execute one or more computer programs that process, store, and/or manage any operations, functions, etc., by operating or generating output data based on input data. For example, the methods and/or various example embodiments of the present disclosure may be performed by a special purpose logic circuit such as a field programmable gate array (FPGA) or application specific integrated circuit (ASIC), and the device and/or system for performing the methods and example embodiments of the present disclosure may be implemented as special purpose logic circuits such as FPGAs or ASICs.

One or more processors for processing a computer program may include either general or special purpose microprocessors, and/or any one or more processors of any kind of digital computing device. A processor may receive instructions and/or data from a read-only memory or a random-access memory, or both. Components of a computing device for executing the methods and/or example embodiments of the present disclosure may include at least one processor for executing instructions and one or more memory devices for storing instructions and/or data.

According to an example embodiment, a computing device may receive from and transmit data to one or more mass storage devices for storing data. For example, the computing device may receive data from and/or transmit data to magnetic disks or optical disks. A non-transitory computer readable medium suitable for storing instructions and/or data associated with a computer program may include any type of non-volatile memory including semiconductor memory devices such as erasable programmable read-only memory (EPROM), electrically erasable PROM (EEPROM), and flash memory devices, but is not limited thereto. For example, the non-transitory computer readable medium may include a magnetic disk such as an internal hard disk or a removable disk, a photomagnetic disk, a CD-ROM and a DVD-ROM disk.

To provide interaction with a user, the computing device may include a display device (e.g., a cathode ray tube (CRT), a liquid crystal display (LCD), etc.) for presenting or displaying information to the user, and a pointing device (e.g., a keyboard, mouse, trackball, etc.) through which the user may provide input and/or commands, or the like, on the computing device, but is not limited thereto. In other words, the computing device may further include any other kind of device for providing interaction with the user. For example, the computing device may provide any form of sensory feedback to the user for interaction with the user, including visual feedback, auditory feedback, and/or tactile feedback, and the like. In contrast, the user may provide an input to the computing device through various gestures such as sight, voice, and action.

In the present disclosure, various example embodiments may be implemented in a computing device including a back-end component (e.g., a data server), a middleware component (e.g., an application server) and/or a front-end component. In this case, the components may be interconnected by any form or medium of digital data communication, such as a communication network. According to an example embodiment, the communication network may include wired networks such as Ethernet, Power Line Communication, telephone line communication apparatus, and RS-serial communication, mobile communication networks, wireless networks such as WLAN (Wireless LAN), Wi-Fi, Bluetooth, and ZigBee, or a combination thereof. For example, the communication network may include a local area network (LAN), a wide area network (WAN), and the like.

A computing device based on the exemplary embodiments described herein may be implemented using hardware and/or software configured to interact with the user, including a user device, a user interface (UI) device, a user terminal, or a client device. For example, the computing device may include a portable computing device such as a laptop computer. Additionally or alternatively, the computing device may include personal digital assistants (PDA), tablet PCs, game consoles, wearable devices, internet of things (IoT) devices, virtual reality (VR) devices, augmented reality (AR) devices, but is not limited thereto. The computing device may further include other types of devices configured to interact with the user. In addition, the computing device may include a portable communication device suitable for wireless communication over a network such as a mobile communication network (e.g., a mobile phone, a smart phone, a wireless cellular phone, etc.), and the like. The computing device may be configured to communicate with a network server wirelessly using wireless communication technologies and/or protocols such as radio frequency (RF), microwave frequency (MWF), and/or infrared ray frequency (IRF).

In the present disclosure, various example embodiments including specific structural and functional details are illustrative. Therefore, example embodiments of the present disclosure are not limited to those described above, and may be implemented in various other forms. In addition, the terms used herein are intended merely to describe some example embodiments and are not to be construed as limiting the example embodiments. For example, singular words and the above may be construed to include the plurals as well, unless the context clearly dictates otherwise.

Unless otherwise defined herein, all terms used herein including technical or scientific terms have the same meanings as those generally understood by a person skilled in the art. In addition, commonly used terms such as terms defined in the dictionary should be interpreted as having a meaning consistent with the meaning in the context of the related art.

Although the present disclosure has been described with reference to some example embodiments herein, various modifications and changes can be made without departing from the scope of the present disclosure that can be understood by those skilled in the art to which the present disclosure pertains. In addition, the modifications and changes are to be construed as being included within the scope of the appended claims.

What is claimed is:

1. A virtual reality (VR)-based fire response simulation device for secondary battery production, comprising:
   a memory configured to store at least one instruction; and
   at least one processor configured to execute the at least one instruction stored in the memory to perform operations comprising:
   receiving a gaze direction and gaze location of a user identified from a head mounted display (HMD);
   displaying fire response content associated with a secondary battery production facility corresponding to the received gaze direction and gaze location on an area of a display of the HMD, wherein the fire response content comprises a plurality of fire response scenarios, wherein the fire response content comprises virtual reality (VR)-based content associated with fire situations specific to the secondary battery production facility;
   obtaining user behavior information indicating a motion of the user determined from at least one of the HMD or a controller associated with the HMD; and
   executing the fire response content associated with the secondary battery production facility based on the obtained user behavior information.

2. The VR-based fire response simulation device of claim 1, wherein the operations further comprise:
   upon determining, based on the gaze direction and gaze location of the user, a gaze of the user at a predetermined location for a predetermined amount of time, determining that at least one of the plurality of fire response scenarios is resolved.

3. The VR-based fire response simulation device of claim 1, wherein the operations further comprise:
   upon determining, based on the user behavior information, an action associated with fire propagation is performed by the user, determining that at least one of the plurality of fire response scenarios is resolved.

4. The VR-based fire response simulation device of claim 1, wherein the operations further comprise:
   upon determining, based on the user behavior information, a touch of the user at a predetermined area, determining that at least one of the plurality of fire response scenarios is resolved.

5. The VR-based fire response simulation device of claim 1, wherein the operations further comprise:

upon determining at least one of the plurality of fire response scenarios is completed, displaying question information associated with the at least one of the plurality of fire response scenarios; and receiving a response to the question information.

6. The VR-based fire response simulation device of claim 1, wherein the operations further comprise:

determining whether the user satisfies a guide condition based on the gaze direction and gaze location of the user; and upon determining the user satisfies the guide condition, displaying user guide information associated with at least one of the plurality of fire response scenarios.

7. The VR-based fire response simulation device of claim 1, wherein the operations further comprise:

determining whether at least one of the plurality of fire response scenarios is completed by the user;

upon determining the at least one of the plurality of fire response scenarios is completed, calculating response capability information of the user corresponding to the at least one of the plurality of fire response scenarios based on a progress time of the at least one of the plurality of fire response scenarios; and displaying the calculated response capability information of the user.

8. A virtual reality (VR)-based fire response simulation method for secondary battery production performed by at least one processor, comprising:

receiving a gaze direction and gaze location of a user identified from a head mounted display (HMD);

displaying fire response content associated with a secondary battery production facility corresponding to the received gaze direction and gaze location on an area of a display of the HMD, wherein the fire response content comprises a plurality of fire response scenarios, wherein the fire response content comprises virtual reality (VR)-based content associated with fire situations specific to the secondary battery production facility;

obtaining user behavior information indicating a motion of the user determined from at least one of the HMD or a controller associated with the HMD; and executing the fire response content associated with the secondary battery production facility based on the obtained user behavior information.

9. The VR-based fire response simulation method of claim 8, further comprising:

upon determining, based on the gaze direction and gaze location of the user, a gaze of the user at a predetermined location for a predetermined amount of time, determining that at least one of the plurality of fire response scenarios is resolved.

10. The VR-based fire response simulation method of claim 8, further comprising:

upon determining, based on the user behavior information, an action associated with fire propagation is performed by the user, determining that at least one of the plurality of fire response scenarios is resolved.

11. The VR-based fire response simulation method of claim 8, further comprising:

upon determining, based on the user behavior information, a touch of the user at a predetermined area, determining that at least one of the plurality of fire response scenarios is resolved.

12. The VR-based fire response simulation method of claim 8, further comprising:

upon determining at least one of the plurality of fire response scenarios is completed, displaying question information associated with the at least one of the plurality of fire response scenarios; and receiving a response to the question information.

13. The VR-based fire response simulation method of claim 8, further comprising:

determining whether the user satisfies a guide condition based on the gaze direction and gaze location of the user; and upon determining that the user satisfies the guide condition, displaying user guide information associated with at least one of the plurality of fire response scenarios.

14. The VR-based fire response simulation method of claim 8, further comprising:

determining whether at least one of the plurality of fire response scenarios is completed by the user;

upon determining the at least one of the plurality of fire response scenarios is completed, calculating response capability information of the user corresponding to the at least one of the plurality of fire response scenarios based on a progress time of the at least one of the plurality of fire response scenarios; and displaying the calculated response capability information of the user.

15. A non-transitory computer-readable medium storing instructions for executing a virtual reality (VR)-based fire response simulation for secondary battery production, the instructions, when executed by one or more processors, causing the one or more processors to perform operations comprising:

receiving a gaze direction and gaze location of a user identified from a head mounted display (HMD);

displaying fire response content associated with a secondary battery production facility corresponding to the received gaze direction and gaze location on an area of a display of the HMD, wherein the fire response content comprises a plurality of fire response scenarios, wherein the fire response content comprises VR-based content associated with fire situations specific to the secondary battery production facility;

obtaining user behavior information indicating a motion of the user determined from at least one of the HMD or a controller associated with the HMD; and executing the fire response content associated with the secondary battery production facility based on the obtained user behavior information.

* * * * *